United States Patent
Sauvage et al.

(10) Patent No.: US 7,260,101 B2
(45) Date of Patent: Aug. 21, 2007

(54) AUTO-CONFIGURATION PROCESS FOR A POINT CODE IN A COMMON CHANNEL SIGNALING NETWORK

(75) Inventors: Pierre Sauvage, Notre Dame de Commiers (FR); Eric Julien, Lyons (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 939 days.

(21) Appl. No.: 09/755,156

(22) Filed: Jan. 8, 2001

(65) Prior Publication Data

US 2002/0051426 A1 May 2, 2002

(30) Foreign Application Priority Data

Oct. 31, 2001 (EP) ................................ 00410134

(51) Int. Cl.
*H04L 12/28* (2006.01)
(52) U.S. Cl. ................... 370/410; 370/522; 379/32.03; 379/221.09
(58) Field of Classification Search ................ 370/410, 370/522, 524, 225; 379/229, 230
See application file for complete search history.

(56) References Cited

U.S. PATENT DOCUMENTS

| | | | | |
|---|---|---|---|---|
| 5,084,816 A | * | 1/1992 | Boese et al. ................. | 370/225 |
| 5,475,732 A | * | 12/1995 | Pester, III ................. | 379/32.01 |
| 5,844,895 A | * | 12/1998 | Gradisching ................. | 370/385 |
| 5,898,667 A | * | 4/1999 | Longfield et al. ............ | 370/225 |
| 5,905,724 A | * | 5/1999 | Carson et al. .............. | 370/385 |
| 5,926,482 A | * | 7/1999 | Christie et al. ............. | 370/469 |
| 6,011,803 A | * | 1/2000 | Bicknell et al. ............. | 370/467 |
| 6,282,191 B1 | * | 8/2001 | Cumberton et al. ......... | 370/352 |
| 6,324,183 B1 | * | 11/2001 | Miller et al. ................. | 370/467 |
| 6,438,223 B1 | * | 8/2002 | Eskafi et al. ............ | 379/221.13 |
| 6,449,278 B2 | * | 9/2002 | Rose .......................... | 370/397 |
| 6,678,242 B1 | * | 1/2004 | Simon ........................ | 370/218 |
| 6,731,649 B1 | * | 5/2004 | Silverman ................... | 370/466 |

\* cited by examiner

*Primary Examiner*—Doris H. To
*Assistant Examiner*—Ian N. Moore

(57) ABSTRACT

Configuration of a new point code connected to a SS7 network through a MTP level 3 aligned link, involves listening to point code status massages originating from distant point codes and forwarded on said link. When a message originating from an unknown distant point code is received, the table of distant point codes is updated with the point code number of the distant point code; at the same time, a primary route to the new distant point code through the link may be created. Therefore, configuration and testing of a new point code within an existing SS7 network, without having to re-enter the full network architecture, is facilitated.

16 Claims, 1 Drawing Sheet

AUTO-CONFIGURATION PROCESS FOR A POINT CODE IN A COMMON CHANNEL SIGNALING NETWORK

FIELD OF THE INVENTION

The invention relates to signalling point code operating under Common Channel Signalling, and more specifically to the configuration of a point code in Common Channel Signalling network. A point code in such a network is a network node, identified by a unique point code number.

BACKGROUND

A telecommunications network consists of a number of switches and application processors interconnected by transmission circuits; in traditional networks, signalling systems use dial pulse and multiple frequency tones to transmit calls and circuit related information. These signalling systems lack the capability to handle additional services to the user. It was therefore suggested to provide a separate signalling network in addition to the traditional network used for routing communications. Common Channel Signalling was devised for such a signalling network. It is a signalling method, in which a sigalling channel conveys signalling information by means of labelled messages; examples of common channel signalling systems are CCITT Signalling System no. 7, and various national versions such as the Bell Communications Research (Bellcore) and AT&T SS7 standards. SS7 architecture is detailed in these standards, or in SS7 Basics of Toni Beninger, Telephony, Div. Intertec Publishing Corp., Sept. 1991. SS7 is designed to provide an internationally standardised, general-purpose signalling system. The invention is discussed in the rest of the specification in the preferred embodiment of SS7 protocol.

SS7—as an example of Common Channel Signaling protocol—is comprised of several layers. It comprises three MTP (Message Transfer Part) levels entitled MTP Level 1 to MTP Level 3. MTP level 1 corresponds to the OSI layer 1 (physical layer); MTP Level 2 corresponds to OSI layer 2 (Data Link layer), and MTP level 3 corresponds to the bottom of OSI layer 3 (Network layer). SS7 also comprises a Signalling Connection Control Part (SCCP) corresponding to the top of OSI layer 3. Further layers are provided, but their description is not necessary for the understanding of the present invention.

MTP Level 1.

MTP Level 1 is known as the signalling data link. A signalling data link is a bi-directional transmission path for signalling, comprised of two data channels operating together in opposite directions at the same data rate.

For operating properly under MTP Level 1, a given point code should know the type of MTP Level 1 protocol used on the SS7 network, as well as the different parameters of this protocol, such as clock signal configuration, bit encoding type, used cable instance.

MTP Level 2.

MTP Level 2, together with MTP Level 1, provides a signalling link for reliable transfer of signalling messages between two directly connected signalling points. Message formats comprise three types of signal units: message signal units (MSU), link status signal units (LSSU) and fill-in signal units (FISU). Fill-in signal units are normally transmitted when not MSUs or LSSUs are being transmitted; this allows the SS7 network to receive immediate notification of signalling link failure.

In addition to defining these three types of messages, MTP Level 2 provides an initial alignment procedures (IAP); these procedures occur when a signalling link is activated for the first time or restored after a link failure. There is provided a normal alignment procedure, and an emergency alignment procedure. A "proving state" is provided included in both procedures to measure error rates, ensuring that a reliable link is established. A SS7 point code issuing a request for alignment under the normal IAP expects to receive an answer within a time predetermined by a timer.

For operating properly under MTP Level 2, a given point code should know the time slot in case a time division multiplex is used.

MTP Level 3.

MTP Level 3 provides the functions and procedures related to message routing and network management. MTP Level 3 handles these functions assuming that signalling points are connected with signalling links are described in MTP Level 1 and MTP Level 2. More specifically, after MTP Level 2 alignment is carried out, a SS7 point code issues a signalling link test message (SLTM).

One problem with SS7 devices is that they need to be configured for proper operation within an existing SS7 network. This requires a large SS7 protocol knowledge, a complete documentation and some time. This problem appears not only when a new SS7 platform is installed, but also whenever a new SS7 device is added to an existing netwrok, or modified in an existing network. In other words, apart from the installation problem, there is a problem in dynamically configuring a SS7 platform.

SUMMARY OF THE INVENTION

The invention provides a solution to this problem. It allows a new SS7 point code to operate with no or minimum human configuration. The user does not need to know all the SS7 standards and the specific configuration parameters of the point code to get the point code up and running. The user may therefore concentrate on the application embodied in the point code, without being distracted by configuration problems. The cost of a product embodying the invention is reduced:

configuration documents may be shorter, and need fewer upgrades;

less training is necessary for installation;

less support is necessary for installation.

The invention applies at the time a SS7 platform is installed; it also applies to dynamic configuration of an existing network, e.g. every time a device is added to the platform.

More specifically, the invention proposes a process for updating a table of distant point codes in a point code connected to a signalling system 7 network through at least one MTP Level 3 aligned link, comprising:

listening to point code status messages originating from distant point codes forwarded on said link, and upon receiving a message originating from a distant point code, updating said table with the point code number of said distant point code.

The step of updating may further comprise configuring a primary route to the distant point code through said link, or additionally checking said primary route using a signalling route set test.

The invention further provides a process for setting MTP Level 1 parameters in a point code connected to a signalling system 7 network through at least one link, comprising:
issuing a MTP Level 2 alignment request on said link for a given combination of said parameters, and
when no response is received on said link, changing said combination of parameters, and repeating said step of issuing an alignment request;
when a response is received on said link, setting said parameters according to the parameters of said combination.

It is preferred that the alignment request be a normal alignment request. The parameters may comprise at least one of clock signal configuration, bit encoding type, used cable instance. It is another preferred feature that a protocol on said link is a time division multiplex protocol, and in this case, the parameters further comprise a time slot.

Last, the invention provides a process for determining point code number of a point code connected to a signalling system 7 network through at least one link, comprising:
proceeding with MTP Level 2 alignment of said link, and upon receiving a signalling link test message on said link,
defining said point code number as a destination address in said signalling link test message.

BRIEF DESCRIPTION OF THE DRAWING

Other features and aspects of the invention will appear upon reading of the following description of the preferred embodiments, in conjunction with the accompanying drawings, in which FIG. 1 shows a flowchart of a configuration process according to the invention.

DETAILED DESCRIPTION OF EMBODIMENTS OF THE INVENTION

Figure 1:
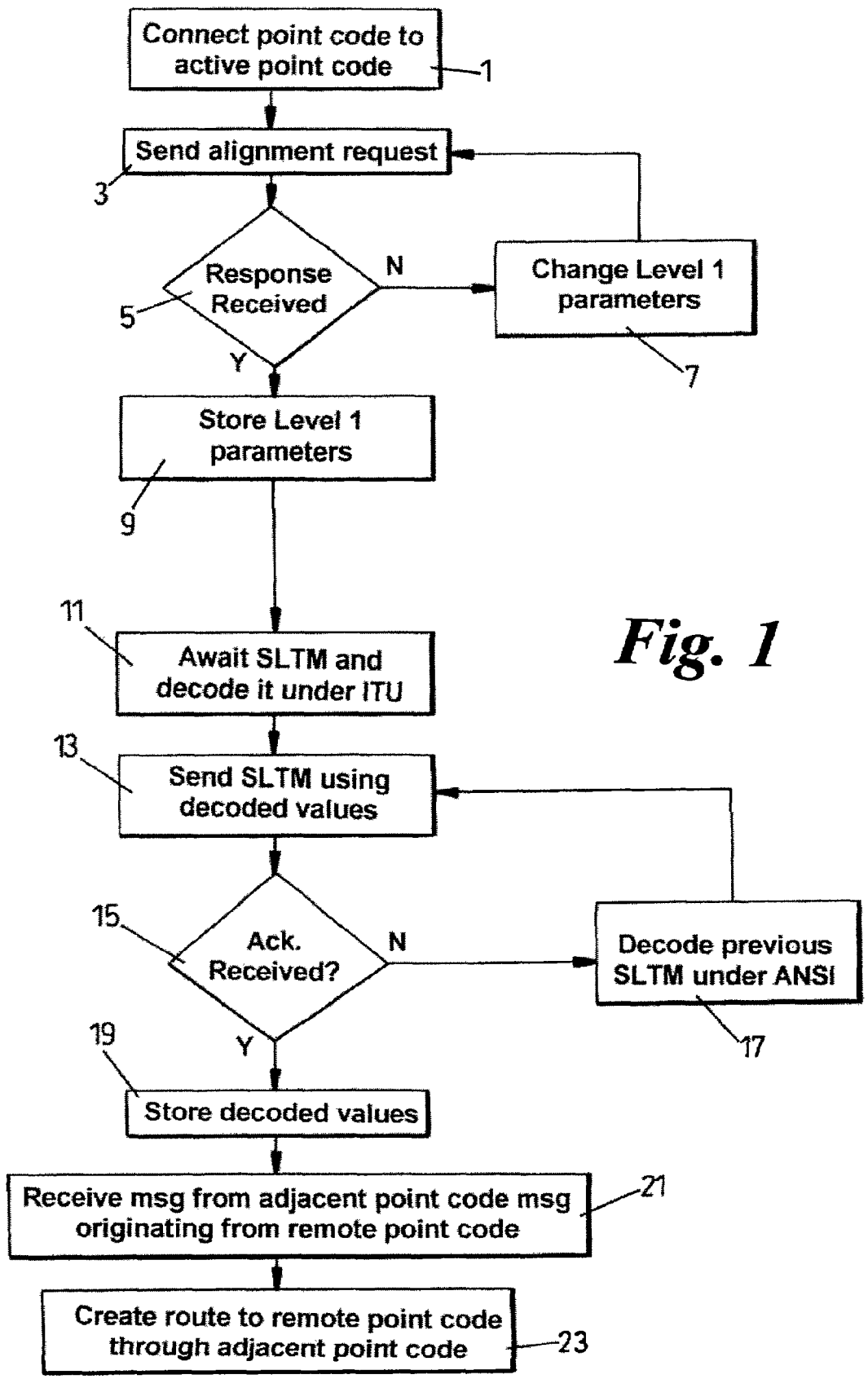
FIG. 1 is a flowchart of a configuration process according to an embodiment of the invention.

The invention provides a solution for partially or totally auto-configuring a SS7 point code. For operating a SS7 point code, parameters for MTP Level 1, MTP Level 2, MTP Level 3 and SCCP may have to be configured; the invention provides a solution for MTP Level 1 parameters, and/or for MTP Level 3 parameters.

In order to configure a point code, the point code is first connected by at least one link to at least one active SS7 signalling point code. Since the invention relies on knowledge of the network by adjacent point codes, the active point code used in the invention is preferably not one undergoing auto-configuration according to the invention. It is assumed at that time that the type of level 1 protocol used on the network—e.g. V35—is known at the time the point code is installed. Physical characteristics of the link—e.g. type of cable or type of line—are also presumed to be known for allowing a proper connection to the active point code(s). Thus, after step 1 of FIG. 1, the point code to be configured is connected on a link to one active SS7 signalling point code.

In one embodiment, for configuring the point code under MTP Level 1, the point code to be configured issues requests for normal IAP as provided in MTP Level 2, for possible parameters of the MTP Level 1 protocol, until a response from the active SS7 signalling point code is received. It should be noted here that issuing a request for alignment under MTP Level 2 does not require the identity of the neighbouring SS7 point code at the other end of the link. The point code to be configured may thus issue requests on the link, without knowing MTP Level 1 parameters nor the identity of the active SS7 point code.

At step 3, the point code to be configured thus issues a MTP Level 2 normal IAP request, on the link to the active point code. The point code to be configured then awaits a response to the alignment request, at step 5. If a response is received within the predetermined time allowed for the response, the process proceeds to step 9, and if no response is received, the process proceeds to step 7.

At step 7, no response to the LAP request is received. This means that the request was not recognised by the active point code, and thus that the MTP Level 1 parameters with which the request was issued were not the correct ones. The point code to be configured therefore changes the MTP Level 1 parameters, and proceeds again to step 3 to issue a new alignment request.

It should be noted that the number of combinations for the parameters of MTP Level 1 is finite. Typically, the following parameters may be considered:
clock signal configuration;
bit encoding type;
used cable instance.

The clock speed may also take a limited number of values. In the case of V35, in most of the SS7 set-up, the clock speed may take up to 3 different values (48K, 56K or 64K). The bit encoding type may take two values—with or without bit inversion. The used cable instance is basically a port number, and may take 4 values. It should be noted that some of these parameters are more likely to be encountered than others. It is preferable to first test the more likely parameters to reduce the duration of the process.

In addition to these parameters, different time channels may be used in case of lime division multiplex signals. Typically, there are 31 time slots in E1, and 24 time slots in T1, which are equally likely.

The total maximum number of trials for scanning all possible parameters combinations would thus be around 700. Bearing in mind that some combinations are more likely than others, the average number of trials for finding the good combination of parameters is likely to be around 100. For a typical timer of 20 seconds per attempt, the first steps of the invention may be carried out automatically by the machine in less than 2000 s.

Whatever the number of combination, it should be understood that this number is finite, so that the process will in any case not remain in the loop formed of steps 3, 5 and 7.

Most implementations, including this one, use normal IAP and not emergency LAP. Indeed this is an arbitrary choice but normal IAP is the most common procedure.

When the process comes to step 9, a successful response to the IAP request is received, and a full alignment procedure is carried out. The point code to be configured then issues FISU messages on the link, according to standard MTP Level 2 behaviour.

At this time, the parameters of MTP Level 1 and the time slots used in case of a TDM signal (MTP Level 2) are determined, and may be stored. These parameters do not comprise timers that may need to be set. Default timers values may be assumed (as recommended by the standard).

After step 9, all MTP Level 1 and MTP Level 2 parameters are set. No human operation is needed up to this step, apart from establishing the physical connection with the active point code.

The process may then proceed to step 11, for determinaing MTP Level 3 parameters, if necessary. For determining MTP Level 3 parameters, the process relies in steps 11 to 19 on the fact that a signalling link test message (SLTM) is automatically issued after MTP Level 2 alignment procedure. The invention also relies on the fact that the architecture of the network is already known to active SS7 point codes. Specifically, the active SS7 point code to which the point code to be configured is attached is aware of the code number of the point code to be configured.

At step 11, the point code to be configured awaits a SLTM from the active point code connected to the link. This message allows the point code to be configured to discover:
the local point code number—the identity of the point code to be configured;
the remote point code number—the identity of the active point code on the link;
the sub-service field;
the signalling link code (SLC).

Decoding of the SLTM may depend upon the network standard—ANSI or ITU—which was not discussed up to now. The invention therefore suggests decoding under one standard—say ITU for instance—and transmitting a new SLTM message on the link, based on the decoded information. If a proper SLTM message is sent to the active point code, it should be acknowledged, while an incorrect SLTM message has no reason to be acknowledged by the active point code on the other side of the link.

At step 13, the point code to be configured thus issues a SLTM, based on the information decoded under ITU. At step 15, it waits for an acknowledgement from the active point code. If an acknowledgement is received within the normal timer, the process proceeds to step 19. Else, the process proceeds to step 17.

At step 17, no answer from the active point code is received in response to the SLTM issued by the point code to be configured. It may then be assumed that the decoding of the received SLTM under ITU did not provide the relevant information. It is then possible to decode the previously received SLTM under ANSI, for obtaining correct values of local point code number, remote point code number, sub-service filed and signalling link code.

The process then proceeds to step 19. At step 19, the decoded values of local point code number, remote point code number, sub-service filed and signalling link code are stored.

At this point, the link with the active point code is fully configured. The same process may be carried out with other links, so that the point code to be configured knows the identity—point code number—of all adjacent point codes, as well as the corresponding signaling link code. Of course, if some of the MTP Level 1 parameters are already known, there is no need to repeat the whole process; it may be sufficient to proceed with MTP Level 2 IAP for automatically having an adjacent point code issue a SLTM.

The point code to be configured simply fails to know the complete structure of the network. In order to fully determine the structure of the network, the process of steps 21 to 23 takes advantage of the route set test configuration provided in SS7.

Specifically, at step 21, the point code to be configured awaits a message routed from an adjacent point code, but originating from a new remote point code, that is from a remote point code unknown at this time. Such a message may simply be identified thanks to its routing label, and more specifically, thanks to the indication of its origin in the routing label. When such a message is received, it is routed under usual MTP Level 3 procedures: if the code point to be configured is the message destination, the message is sent to message distribution, and if the point code to be configured is not the message destination, the message is routed further.

The message may simply be a point code status message issued by remote point codes.

In addition to this usual behaviour, at next step 23, the point code to be configured creates a primary route to the new remote point code, through the adjacent point code that transmitted the message. Thus, any time a message originating from a new remote point code is received, the new point code is recognised and stored by the point code to be configured. The primary route to this new point code is supposed to go through the adjacent point code from which the message was received. This may be checked simply by deactivating the primary route, and by using the signalling route set test provided for in MTP Level 3; this test is performed at a given code point to query whether signalling traffic towards a certain destination may be routed by an adjacent code point. This makes it possible not only to build a table of remote code points with their primary route, but also to check new routes from a remote point code.

After step 23, the process proceeds back to step 21, and awaits a new message from a remote point code. The process may stop loop through steps 21-23 once a given number of point codes is determined—e.g. if the total number of point codes in the network is known—or by abandoning the loop is no new point code is added during a certain amount of time—this is not represented in FIG. 1.

The process of steps 21-23 makes it possible to build automatically a table of remote point codes, simply by listening to messages routed through the point code to be configured. The process first allows a point code to be tested without having to completely enter the full structure and configuration of the network; for test purposes, a limited knowledge of remote point codes may be sufficient; full knowledge of the network may be obtained later.

In addition, these steps avoid full programming of the network structure in the point code to be configured. Last, they make it possible for a given device to determine access routes to non-adjacent devices.

As discussed above, the process depicted in FIG. 1 allows a point code to be configured in an existing network, without any knowledge of the SS7 protocol. Auto-configuration uses existing tools and procedures of SS7 protocol, but contrary to their normal destination.

In order to comply with the SS7 network availability and security requirements, an operator may be asked to confirm the configuration values obtained according to the invention. It is also possible to lock part or all of the auto-configuration mechanism.

The process of FIG. 1 was disclosed above in full details. It may not be necessary in any instance to carry out all successive steps of FIG. 1. It thus appears to the person skilled in the art that the following parts of the process may be carried out independently of each other:
derive MTP Level 1 and time slots through MTP Level 2 IAP (steps 1-9);
use SLTM after MTP Level 2 alignment for obtaining local point code number (steps 11-19);
update network structure by listening to point code status messages issued by remote point code (steps 21-23).

It is of course of practical use to proceed successively to all parts of the process, for deriving full knowledge of the point code and of its surrounding, or for ensuring full configuration of a point code.

The invention claimed is:

1. A process for updating a table of distant point codes, in a point code connected to a signalling system 7 network through at least one MTP Level 3 aligned link, comprising:

listening to point code status messages originating from distant point codes forwarded on said link, wherein the point codes are identified by point code numbers, and wherein an alignment request is issued on said link for a given combination of MTP Level 1 parameter values, and if no response is received on said link, automatically changing the combination of parameter values and reissuing a further alignment request until a message originating from a distant point code is received; and upon receiving the message originating from a distant point code, updating said table with the point code number of said distant point code.

2. The process of claim 1, wherein the step of updating further comprises configuring a primary route to said distant point code through said link.

3. The process of claim 2, further comprising checking said primary route using a signalling route set test.

4. A process for setting MTP Level 1 parameter values in a point code connected to a signalling system 7 network through at least one link, comprising:

issuing a MTP Level 2 alignment request on said link for a given combination of said MTP Level 1 parameter values, when no response is received on said link, changing said combination of parameter values, and repeating said step of issuing an alignment request; and when a response is received on said link, setting said parameter values according to the parameter values of said combination.

5. The process of claim 4, wherein said alignment request is a normal alignment request.

6. The process of claim 4, wherein said MTP Level 1 parameter values comprise values of at least one of clock signal configuration, bit encoding type, used cable instance.

7. The process of claim 4, wherein a protocol on said link is a time division multiplex protocol, and wherein said MTP Level 1 parameter values further comprise values of a time slot.

8. A process for determining a point code number identifying a point code connected to a signalling system 7 network through at least one link, comprising:

proceeding with MTP Level 2 alignment of said link by issuing an alignment request on said link for a given combination of MTP Level 1 parameter values, and if no response is received on said link, automatically changing the combination of parameter values, and issuing a further alignment request until a signalling link test message is received on said link, and upon receiving a signalling link test message on said link, defining said point code number as a destination address in said signalling link test message, wherein the point codes are identified by point code numbers and are stored in a table.

9. A process for configuring a point code connected to a signalling system 7 network through at least one link comprising:

setting MTP Level 1 parameter values by: issuing a MTP Level 2 alignment request on said link for a given combination of said parameter values, and when no response is received on said link, changing said combination of parameter values, and repeating said step of issuing an alignment request; when a response is received on said link, setting said parameter values according to the parameter values of said combination; and updating in the point code a table of distant point codes, identified by point code numbers, by listening to point code status messages originating from distant point codes forwarded on said link, and upon receiving a message originating from a distant point code, updating said table with the point code number of said distant point pode.

10. The process of claim 9, wherein the step of updating further comprises configuring a primary route to said distant point code through said link.

11. The process of claim 10, further comprising checking said primary route using a signalling route set test.

12. The process of claim 10, wherein said alignment request is a normal alignment request.

13. The process of claim 10, wherein said parameter values comprise values of at least one of clock signal configuration, bit encoding type, used cable instance.

14. The process of claim 10, wherein a protocol on said link is a time division multiplex protocol, and wherein said parameter values further comprise values of a time slot.

15. A process for configuring a point code connected to a signalling system 7 network through at least one link comprising:

setting MTP Level 1 parameter values, said parameter values comprising values of at least one of clock signal configuration, bit encoding type, used cable instance, by: issuing a MTP Level 2 normal alignment request on said link for a given combination of said parameter values, and when no response is received on said link, changing said combination of parameter values, and repeating said step of issuing an alignment request; when a response is received on said link, setting said parameter values according to the parameter values of said combination; and updating in the point code a table of distant point codes, identified by point code numbers, by listening to point code status messages originating from distant point codes forwarded on said link, and upon receiving a message originating from a distant point code, updating said table with the point code number of said distant point code; configuring a primary route to said distant point code through said link; and checking said primary route using a signalling route set test.

16. The process of claim 15, wherein a protocol on said link is a time division multiplex protocol, and wherein said parameter values further comprise values of a time slot.

* * * * *